Patented Aug. 24, 1926.

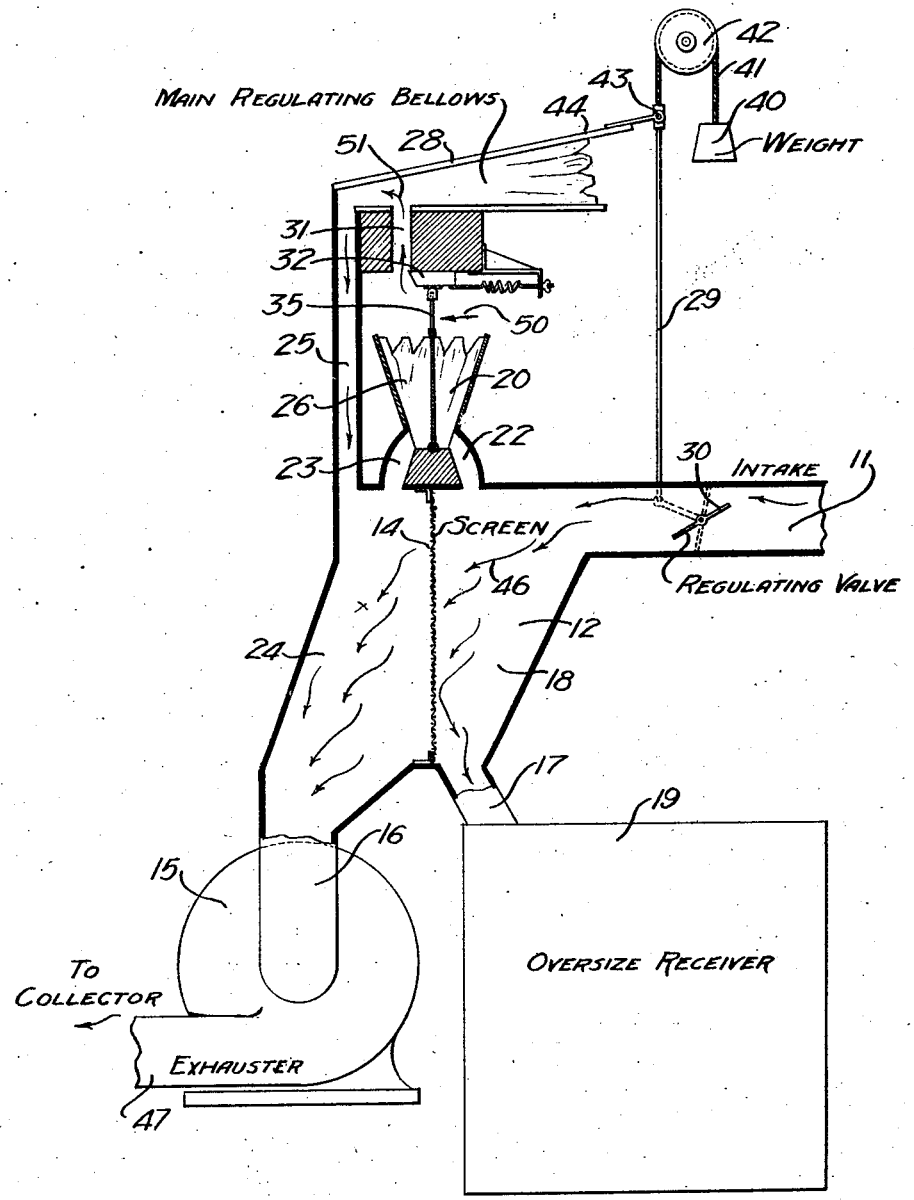

1,597,051

UNITED STATES PATENT OFFICE.

NICHOLAS E BROWN, OF LOS ANGELES, CALIFORNIA, ASSIGNOR TO THE BRAUN CORPORATION, A CORPORATION OF CALIFORNIA.

AUTOMATIC REGULATOR FOR AIR-SCREENING DEVICES.

Application filed October 30, 1922, Serial No. 597,827. Renewed March 29, 1924.

My invention relates to classifying screens which are used for screening finely divided materials, and relates particularly to the screening of such materials by the use of swiftly moving air currents.

The method commonly employed in the classification of powdered substances consists of passing the substances through graduated screens. Certain materials are of such a nature that in their finer forms they will not pass through ordinary shaking and stationary screens at practicable speeds. For the purpose of handling such materials recourse is had to a method in which an air stream is loaded with the material to be classified. This air stream is passed through grading screens and carries with it those materials which are of small enough size to pass through the screens, those particles which are too large being dropped into convenient oversize receivers. By the employment of this method a very rapid screening of materials is attained.

Although this method constitutes a great improvement in the art of classifying materials, considerable difficulty is experienced in keeping the screens free from clogging which results, due to the varying conditions under which the screening operation is carried on.

It has been found that changes in humidity will affect the characteristics of certain materials to an extent varying the speed at which they will pass through classifying screens; thus it is found that a machine which is set to operate perfectly one day will become clogged the next day, due to atmospheric changes and will require adjustment in the velocity of the air current. Furthermore, the character of the material to be graded may vary slightly from one hour to the next and so affect the passage of the material into the screen that constant attention is necessary, in order to obtain a fair output. Also, if for some reason a part of the screen is blocked with oversize material and the effective area of the screen becomes reduced, the air current thereupon increases in velocity through the remaining part of the screen which causes a further blocking of the screen, with the result that the screen is soon entirely choked up so that no materials will pass therethrough until the pressure is dropped, and the material given a chance to dislodge itself.

It is an object of my invention to provide a regulating means whereby the pressure on the intake side of the screen will be automatically reduced when the pressure upon the discharge or exhaust side of the screen becomes reduced, due to the clogging of the screen or portions thereof, thus equalizing the pressure upon the two sides of the screen and allowing the collected materials to dislodge therefrom.

It is a further object of the invention to provide a device of this character which is very sensitive to pressure changes and which requires no attention after being initially adjusted.

The especial advantages of my invention and further objects thereof will be made evident hereinafter.

Referring to the drawing which is for illustrative purposes only and diagrammatically indicates an apparatus with which my invention is employed, 11 represents an intake flue which leads into a chamber 12, having a screen 14, disposed thereacross and having connection with an exhauster 15 through a discharge duct 16. An air tight chute 17 connects the intake side 18 of the chamber 12 with an oversize receiver 19. A double compartment bellows 20 has the compartments thereof connected with the chamber 12 through ducts 22 and 23, the duct 22 connecting with the intake side 18 and the duct 23 connecting with the exhaust side 24, of the chamber 12. A duct 25 leads from the exhaust side 24 of the chamber 12 to a main regulating bellows 28, which is connected by a link 29 to a butterfly valve 30 situated in the intake flue 11. A passage 31, also connecting with the main regulating bellows 28, has a valve plate 32 associated therewith which is adapted to be moved, by the intermediate partition 35 of the double compartment bellows 20, over the opening of the passage 31 when the left hand compartment 26 of the bellows 20 is collapsed. A regulating spring 38 is attached to the valve plate 32 for the purpose of inserting a resistance against the movement of the plate 32 in a direction to close the passage 31, this adjustment being for the purpose of compensating for the allowable difference in pressure between the sides 18 and 24 when the device is in operation. A wing nut 39 is provided for the purpose of adjusting the tension of the spring 38, and a weight 40 is provided having a cord 41 attached thereto which passes over a pulley 42 and attaches at 43 to the movable element 44 of the main regulating bellows 28, thus serving to normally hold the element 44 in raised position.

The operation of the exhauster 15 creates a current of air through the duct 16 in the chamber 12 and the intake 11. The intake 11 may lead to a supply box or may be connected with another classifying screen. The materials to be classified are drawn through the intake flue by the current of air, into the chamber 12 as indicated by the arrows 46. Those parts of the materials carried in the air stream, which are small enough to pass through the screen 14, are carried on by the air, through the exhauster, and delivered to a collector, or other apparatus, through the discharge flue 47. The oversize particles carried in the air stream impinge against the screen 14 and drop down through the chute 17 into the oversize receiver, from which they are removed at suitable intervals.

In the event that a portion of the screen 14 becomes clogged up so that the effective area of the screen is reduced, the pressure within the exhaust side 24 of the chamber 12 will be reduced below that existing on the intake side thereof, owing to the cutting down of the area of the inlet passage, or more particularly the reducing of the number of screen openings through which air may pass, due to the clogging up of a portion of the screen. This reduction in pressure creates an unbalance in the double compartment bellows 20 and causes the partition 35 to swing in the direction of the arrow 50, and in so doing to move the valve plate 32 against the action of the spring 38, so as to close the passage 31 to an extent corresponding to the amount that the partition 35 is deflected, the extent of deflection of the partition depending on the difference in pressures between the sides 18 and 24, which in turn is consequent upon the extent to which the screen is clogged.

It is to be understood that throughout the operation of the screening device a small amount of air is continuously drawn through the passages 31 and 25, as indicated by the arrows 51. Upon the closing, or partial closing, of the valve plate 32 over the passage 31, the condition of vacuum within the main regulating bellows 28 is increased so that the movable element 44 thereof is drawn downwardly against the lifting action of the weight 40. The downward movement of the member 44 causes the closing of the butterfly regulating valve owing to the interconnection therebetween of the link 29. The degree to which the valve 30 closes is consequent upon the amount of pressure reduction on the exhaust side of the screen 14; thus it will be seen that a slight clogging of the screen 14 would cause only a slight reduction in the pressure in the side 24 of the chamber 12 due to the fact that the passage of air through the screen is constricted to only a small extent. The closing of the valve 32 would only be partial under such condition, and the partial dropping of the elements 44 of the bellows 28 would close the butterfly valve 30 just sufficiently to reduce the pressure in the side 18 of the chamber 12 to cause the dislodgment of the oversize particles adhering to the screen 14. It will further be seen that an extensive clogging of the screen would cause a greater reduction of the pressure in the side 24, with the result that the regulating bellows would be further collapsed, and the regulating valve 30 entirely closed, so that whatever pressure exists in the side 24, is immediately developed in the side 18, thus accomplishing an equalization of pressures on the two sides of the screen which permits the clogging particles to release and drop into the receiver 19.

The arrangement I employ provides a very sensitive regulation of the air current and a screening device equipped therewith will operate continuously for long periods without requiring attention further than the initial adjustment of the spring 38 to correspond to the allowable difference in pressures on the two sides of the screen.

I claim as my invention:

1. In an air screening device, the combination of: walls providing an air passage; an exhauster for drawing a current of air through said passage; a classifying screen disposed across said passage; and regulating means, consequent in actuation upon the variation of the pressures upon each side of said screen, beyond their allowable inequality, for partially closing said passage restricting the flow of air through said passage.

2. A device, as in claim 1, in which said regulating means restricts the inlet of air into said passage when the pressure on the exhaust side of said screen is reduced beyond a designated degree below the pressure on the intake side of said screen.

3. A device, as in claim 1, in which said regulating means includes a valve in said passage and pressure actuated means for closing said valve when said pressures upon the two sides of said screen vary beyond their allowable inequality.

4. A device, as in claim 1, in which said regulating means includes a valve in said passage and bellows for closing said valve.

5. In an air screening device, the combination of: walls providing an air passage; an exhauster for drawing a current of air through said passage; a classifying screen disposed across said passage; and regulating means, consequent in actuation upon the variation of the pressures upon each side of said screen, beyond their allowable inequality, for partially closing said passage and thus restricting the flow of air through said passage, said regulating means having a valve in said passage and bellows for closing said valve, said bellows having air duct communication with said passage.

6. A device as in claim 1, in which said regulating means includes a valve in said passage, a valve operating bellows for closing said valve, said bellows having a valve associated therewith, and a pressure controlled means having communication with said passage on both sides of said screen, for operating said last-mentioned valve to cause a pressure change in said valve operating bellows.

7. In an air screening device, the combination of: walls providing an air passage; an exhauster for drawing a current of air through said passage; a classifying screen disposed across said passage; and regulating means, consequent in actuation upon the variation of the pressures upon each side of said screen, beyond their allowable inequality, for partially closing said passage and thus restricting the flow of air through said passage, said regulating means having a valve in said passage, and valve operating bellows for closing said valve, said bellows having a valve associated therewith, and double compartment bellows having communication with said passage on both sides of said screen for operating said associate valve to cause a pressure change in said valve-operating bellows.

8. In an air screening device, the combination of: walls providing an air passage; an exhauster for drawing a current of air through said passage; a classifying screen disposed across said passage; and regulating means, consequent in actuation upon the variation of the pressures upon each side of said screen, beyond their allowable inequality, for partially closing said passage and thus restricting the flow of air through said passage, said regulating means having a valve in said passage, and valve-operating bellows for closing said valve, said bellows having a valve associated therewith, and double compartment bellows having communication with said passage on both sides of said screen for operating said associate valve to cause a pressure change in said valve-operating bellows, said operating bellows being between said associate valve and said passage, said associate valve restricting the flow of air through said valve-operating bellows in said passage.

9. In an air screening device, the combination of: walls providing an air passage; an exhauster for drawing a current of air through said passage; a classifying screen disposed across said passage; and regulating means consequent in actuation upon the variation of the pressure in said passage upon each side of said screen beyond their allowable inequality, for partially closing said passage and thus reestablishing a balance of pressures between said sides of said screen.

In testimony whereof, I have hereunto set my hand at Los Angeles, California, this 25th day of October 1922.

NICHOLAS E. BROWN.